(12) United States Patent
McDermitt, Jr.

(10) Patent No.: US 7,972,252 B1
(45) Date of Patent: Jul. 5, 2011

(54) ERGONOMIC TOOL LIFTING MACHINE AND METHOD

(75) Inventor: Freedus McDermitt, Jr., St. Marys, OH (US)

(73) Assignee: Honda Motor Co., Ltd., Tokyo (JP)

( * ) Notice: Subject to any disclaimer, the term of this patent is extended or adjusted under 35 U.S.C. 154(b) by 1113 days.

(21) Appl. No.: 11/277,634

(22) Filed: Mar. 28, 2006

(51) Int. Cl.
*B23Q 3/157* (2006.01)

(52) U.S. Cl. ............ 483/49; 483/901; 483/902; 483/38; 483/50; 414/226.02; 414/226.05; 414/744.5; 414/744.7; 901/15; 901/16

(58) Field of Classification Search .................. 483/901, 483/902, 38, 48, 49, 50, 51, 53; 414/225.01, 414/226.02, 226.05, 744.5, 744.7; 901/16, 901/15; 248/278.1, 284.1, 291.1
See application file for complete search history.

(56) References Cited

U.S. PATENT DOCUMENTS

| | | | |
|---|---|---|---|
| 3,667,114 A | | 6/1972 | Smith et al. |
| 3,884,363 A | | 5/1975 | Ajlouny |
| 4,141,134 A | * | 2/1979 | Zettler et al. ............ 483/46 |
| 4,359,815 A | * | 11/1982 | Toyoda ............ 483/14 |
| 4,412,775 A | | 11/1983 | Molitor et al. |
| 4,430,040 A | | 2/1984 | Halmos |
| 4,764,883 A | * | 8/1988 | Nakagawa et al. ............ 901/3 |
| 4,837,919 A | * | 6/1989 | Hoppe ............ 483/38 |
| 4,845,835 A | * | 7/1989 | Schneider ............ 483/49 |
| 4,941,798 A | | 7/1990 | Meier |
| 5,093,978 A | * | 3/1992 | Binder ............ 483/43 |
| 5,281,194 A | * | 1/1994 | Schneider ............ 483/14 |
| 5,489,184 A | | 2/1996 | Huggins |
| 5,490,756 A | | 2/1996 | Reichert et al. |
| 6,740,844 B2 | | 5/2004 | Rossi |
| 2004/0258513 A1 | | 12/2004 | Cooke |

FOREIGN PATENT DOCUMENTS

| | | | |
|---|---|---|---|
| EP | 640433 A1 | * | 3/1995 |
| EP | 888853 A1 | * | 1/1999 |

OTHER PUBLICATIONS

Machine Translation of EP-640433-A1 (which patent was published on Mar. 1995), three pages.*
Machine Translation of EP-888853-A1 (which patent was published in Jan. 1999), three pages.*

* cited by examiner

*Primary Examiner* — Erica E Cadugan
(74) *Attorney, Agent, or Firm* — Standley Law Group LLP

(57) ABSTRACT

An ergonomic tool lifting machine and method particularly useful for manipulating a machine tool or another heavy object. In one embodiment of the invention, the machine tool is a large milling cutter. The ergonomic tool lifting machine generally includes an articulating arm attached at a fixed end to a vertical lift mechanism, and at a free end to a grasping device or tool holder adapted for gripping and retaining an object of interest. When the object is a milling cutter, the ergonomic tool lifting machine may be used to transfer the cutter between a stored position and an installed position in a milling machine. Consequently, the tool holder of this embodiment is preferably able to rotate between a pick-up/drop-off position and an installation/removal position associated with the cutter. In general, the ergonomic tool lift machine allows heavy loads to be accurately moved with very little effort required on the part of an operator.

28 Claims, 9 Drawing Sheets

(EXISTING EXEMPLARY MILLING CUTTER)

ERGONOMIC TOOL LIFTING MACHINE AND METHOD

BACKGROUND OF THE INVENTION

The present invention is directed to a tool lifting machine for facilitating the transport, transfer, or otherwise manipulation of heavy tools in an ergonomically-acceptable fashion. More particularly, the present invention is directed to a machine for transferring large milling cutters between a storage position and an installed position in a milling machine with little effort required by an operator.

Ergonomics are an important consideration in many modern day manufacturing environments. That is, most manufacturing-related processes are now examined to make sure that the effort exerted in their performance is not overly burdensome on an operator. A variety of process-related factors may be considered such as, for example, repetitive motion, the required position of the operators limbs and/or body, and the size, shape and/or weight of components and/or tools that must be manipulated by the operator.

While many of these concerns may be obviated through well thought out process and/or equipment design, some cannot. For example, certain process components or tools simply cannot be sufficiently reduced in size and/or weight to achieve a particular ergonomic target. A process employing these components or tools may, therefore, be difficult for an operator to perform—whether on a repetitive basis or otherwise. Similarly, when an operator is required to manipulate large and/or heavy components or tools, there is sometimes a risk of harm to the operator and/or of damage to the components or tools.

Many types of specialized process assisting equipment have been developed to assist operators in performing what would otherwise be difficult tasks. However, to. Applicant's knowledge, no such equipment exists for transferring large machine tools, such as milling cutters, from a storage location to an operating position within a milling machine spindle.

While there may be no such need with respect to small milling cutters, there is such a need for larger cutters. Large milling cutters differ considerably from the small fluted end mills familiar to many. These larger cutters generally comprise a cutter body portion of significant diameter into which is mounted a plurality of cutting elements, thereby allowing for the removal of material from a considerable surface area of a work piece in a single pass. The body portion is typically manufactured of a hardened steel and has extending from one end a tapered shaft that is adapted to be received and retained by a milling machine spindle. As a result of this design, such milling cutters are often very heavy, unbalanced, and difficult to grasp and hold.

In addition to the size and weight of such milling cutters, there is also the problem of manipulating the cutter during installation. Large milling cutters are commonly stored on a rack or cart when not in use. Often, the cutters are suspended in the rack by the larger diameter cutter body—which generally results in the tapered shaft portion extending (vertically) downward toward the ground. Unfortunately, in the case of, for example, a horizontal milling machine, this storage position is rotated 90° from the operating position of the cutter. More particularly, in such a milling machine, the spindle receives the shaft of the cutter in a substantially horizontal position. Consequently, subsequent to removing the cutter from the rack, it must be rotated by the operator prior to being introduced to the spindle of such a machine.

As such, it can be seen that a machine for removing such a milling cutter from a storage rack, rotating the cutter into operating position, and installing the cutter to a milling machine spindle—with little effort required on the part of an operator—would be highly desirable. Preferably, such a machine would be able to manipulate milling cutters for one or more milling machines, regardless of the diameter of the cutter body. Such a machine would greatly reduce the stresses put on an operator during a milling cutter installation/removal procedure, and may reduce tool change time as well. An ergonomic tool lifting machine of the present invention satisfies these requirements.

SUMMARY OF THE INVENTION

An ergonomic tool lifting machine of the present invention is able to easily, quickly and accurately transfer a large milling cutter from a storage position to an installed position in a milling machine spindle, with little effort required on the part of an operator. The ergonomic tool lifting machine makes use of an articulating arm. A fixed end of the articulating arm is connected to a vertical lift mechanism that operates to raise and lower the arm with respect to the ground. The free end of the articulating arm is provided with a grasping device, such as a tool holder, that is adapted to grasp and retain a milling cutter.

The tool holder is provided with a feature that allows it to grasp the milling cutter while the cutter resides in its stored position, and subsequently be rotated 90° such that the milling cutter is placed in an installation position with respect to the milling machine. Preferably, the tool holder is also provided with an interlocked mechanism that prevents the tool holder from over-rotating and possibly dropping a milling cutter during its rotation.

The operator only has to clamp the tool holder onto the milling cutter, operate the vertical lift mechanism to withdraw the milling cutter from the storage cart, rotate the tool holder, and manipulate the articulating arm to insert the tapered shaft of the milling cutter into the milling machine spindle. Operation of the vertical lift mechanism requires only the manipulation of one or more control levers, handles, buttons, or similar actuators. Because the weight of the milling cutter is supported by the articulating arm, little operator effort is required to move the articulating arm between the storage rack and the milling machine.

Therefore, as can be understood from the foregoing description, an ergonomic tool lifting machine of the present invention greatly reduces the effort required to load a large milling cutter. Consequently, an operator can make many tool changes during a shift without concern for injury or damage to the cutters or other equipment.

BRIEF DESCRIPTION OF THE DRAWINGS

In addition to the features mentioned above, other aspects of the present invention will be readily apparent from the following descriptions of the drawings and exemplary embodiments, wherein like reference numerals across the several views refer to identical or equivalent features, and wherein.

DETAILED DESCRIPTION OF THE EXEMPLARY EMBODIMENT(S)

Figure 1:
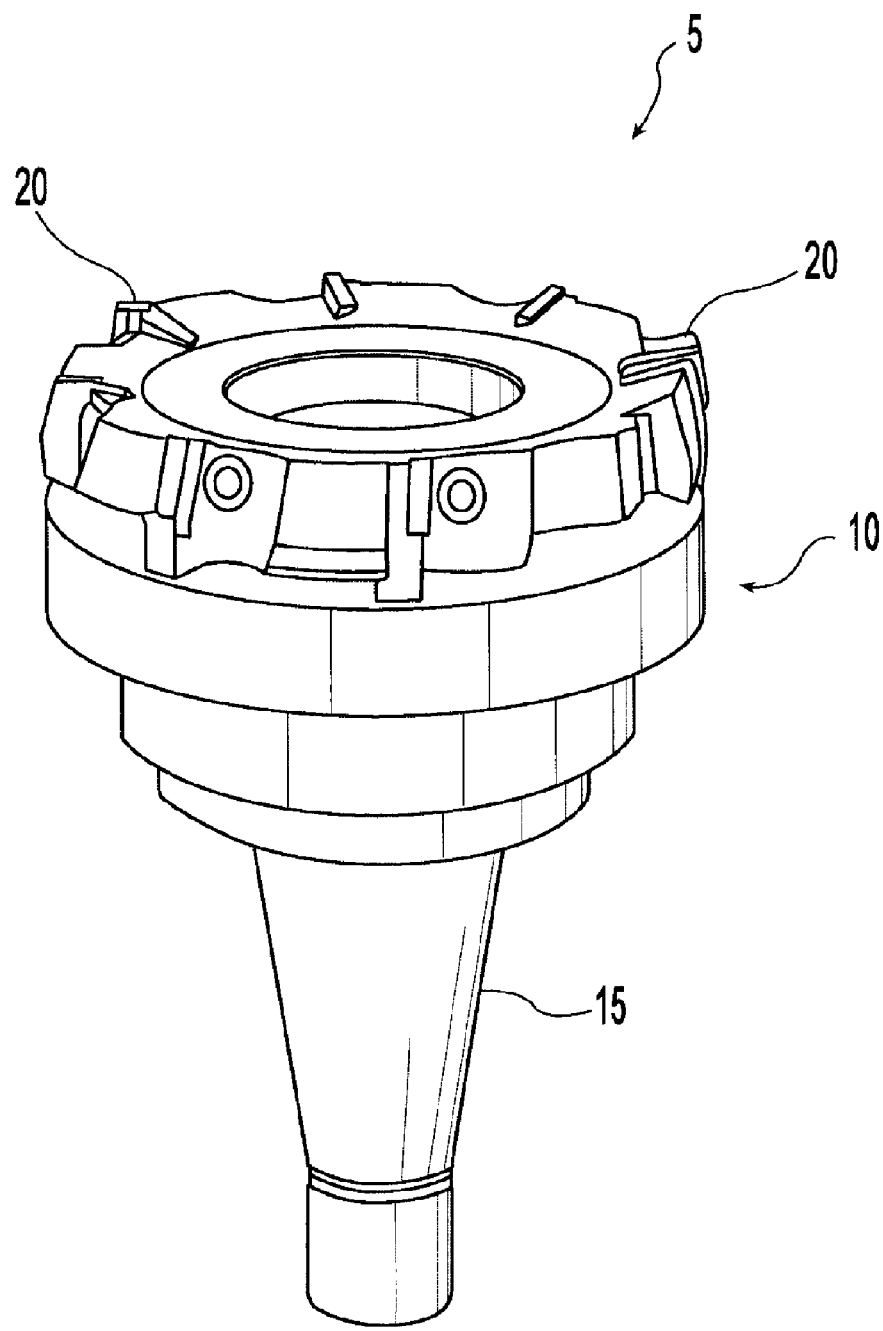
FIG. 1 is a perspective view of a typical large-scale milling cutter.

A typical large-scale milling cutter 5 (e.g., face mill) is shown in FIG. 1. As can be seen, the milling cutter 5 has a substantially cylindrical cutter body 10 portion into which a number of cutting inserts 20 are installed. When the cutter 5 is rotated by a milling machine, these cutting inserts 20 are able to remove material over a relatively large surface area of a work piece.

A tapered shaft (machine taper) 15 extends from the cutter body 10 and is provided for insertion into the spindle of a milling machine. The milling cutter 5 is retained in the milling machine by this machine taper 15. Such a machine taper is the typical method of retaining a large milling cutter in a milling machine spindle, and the standardized shape would be known to one skilled in the art.

Figure 2:
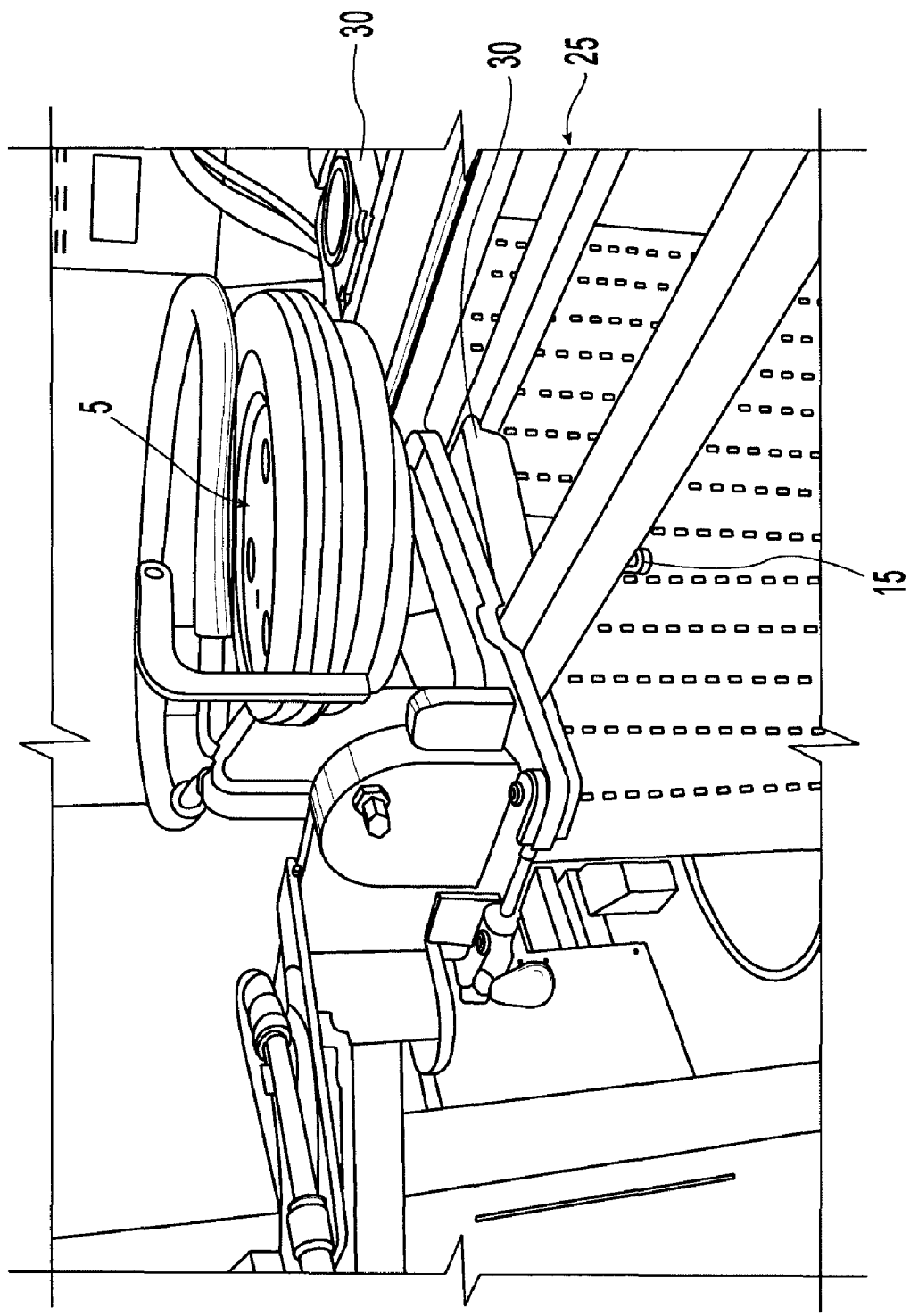
FIG. 2 depicts a common storage position of a milling cutter, such as that shown in FIG. 1, when not in use.

When not in use, such milling cutters 5 are commonly stored on a rack 25 or cart, as shown in FIG. 2. Because the cutter body 10 is typically of larger diameter than the machine taper 15, it is convenient to suspend such milling cutters 5 by the cutter body. For example, in FIG. 2, the cutter body 10 rests in a holder 30 through which the machine taper 15 extends. The holder 30 is supported by rails of the rack 25, thereby suspending the cutter 5 in a position with the machine taper 15 directed substantially downward.

Figure 7:
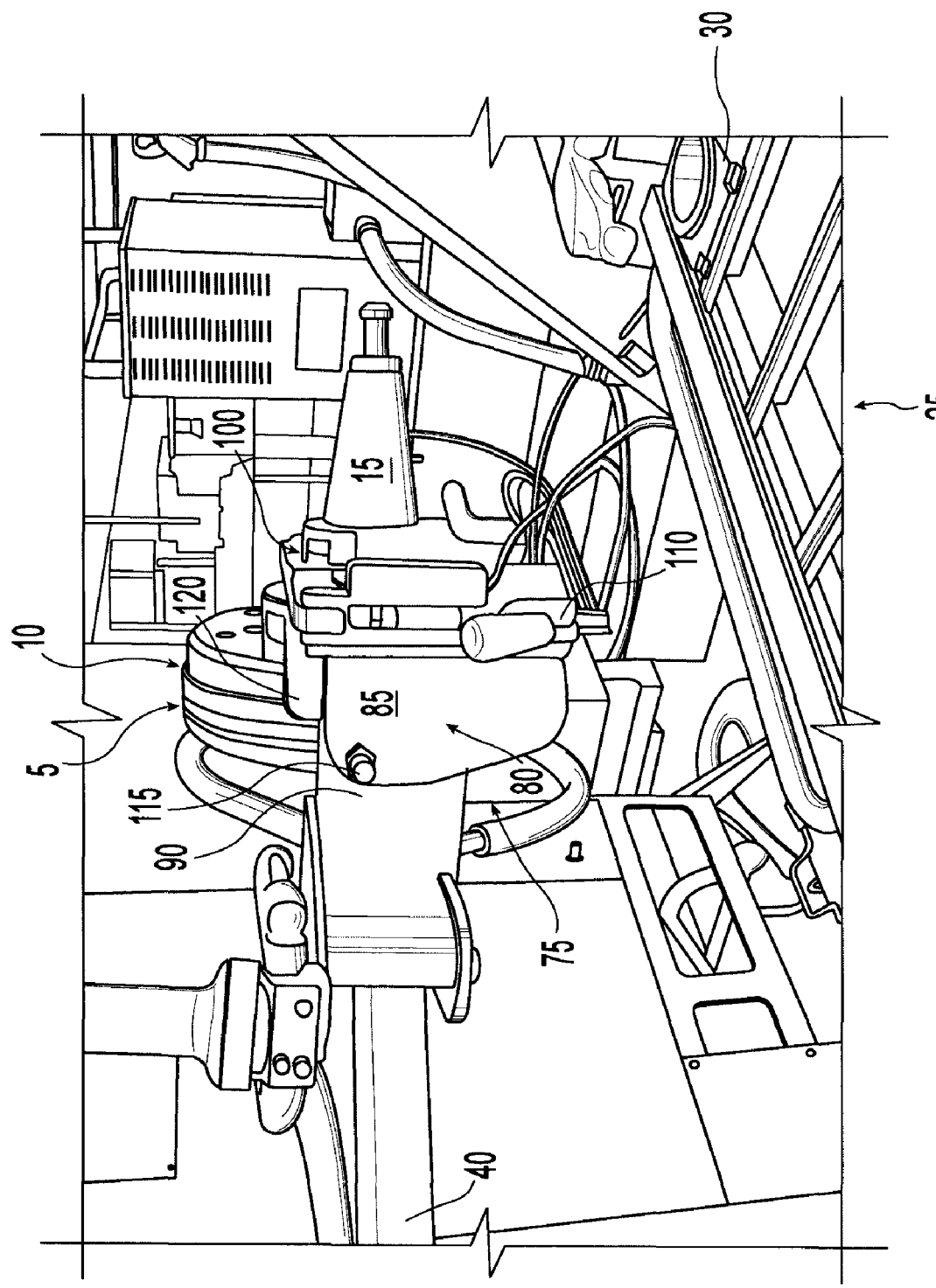
FIG. 7 illustrates the tool holder and milling cutter after removal of the cutter from the rack and rotation to an installation position.

Unfortunately, this is not the position in which such a milling cutter 5 would typically be loaded into or operated by a milling machine. For example, the milling cutter position shown in FIG. 2 is generally rotated 180° from that required for installation to and use by a vertical milling machine. The milling cutter position shown in FIG. 2 is also generally rotated 90° from that required for installation to a horizontally-oriented milling machine spindle (see FIGS. 7-9). Consequently, regardless of what type of milling machine a milling cutter 5 is to be used with, if it resides in the typical storage position depicted in FIG. 2, it will generally be necessary to rotate the milling cutter subsequent to its removal from the storage rack 25.

It can be appreciated that due to the size and weight of many of these milling cutters, it would be ergonomically detrimental to require an operator to remove the cutter from a storage rack 25, rotate the cutter into the proper position, and subsequently insert the machine taper into a milling machine spindle. This is especially true if such a process must be repeated many times over the course of the day. To this end, an ergonomic tool lifting machine of the present invention can be used to facilitate removal, manipulation, transport, and installation of such a milling cutter.

Figure 3:
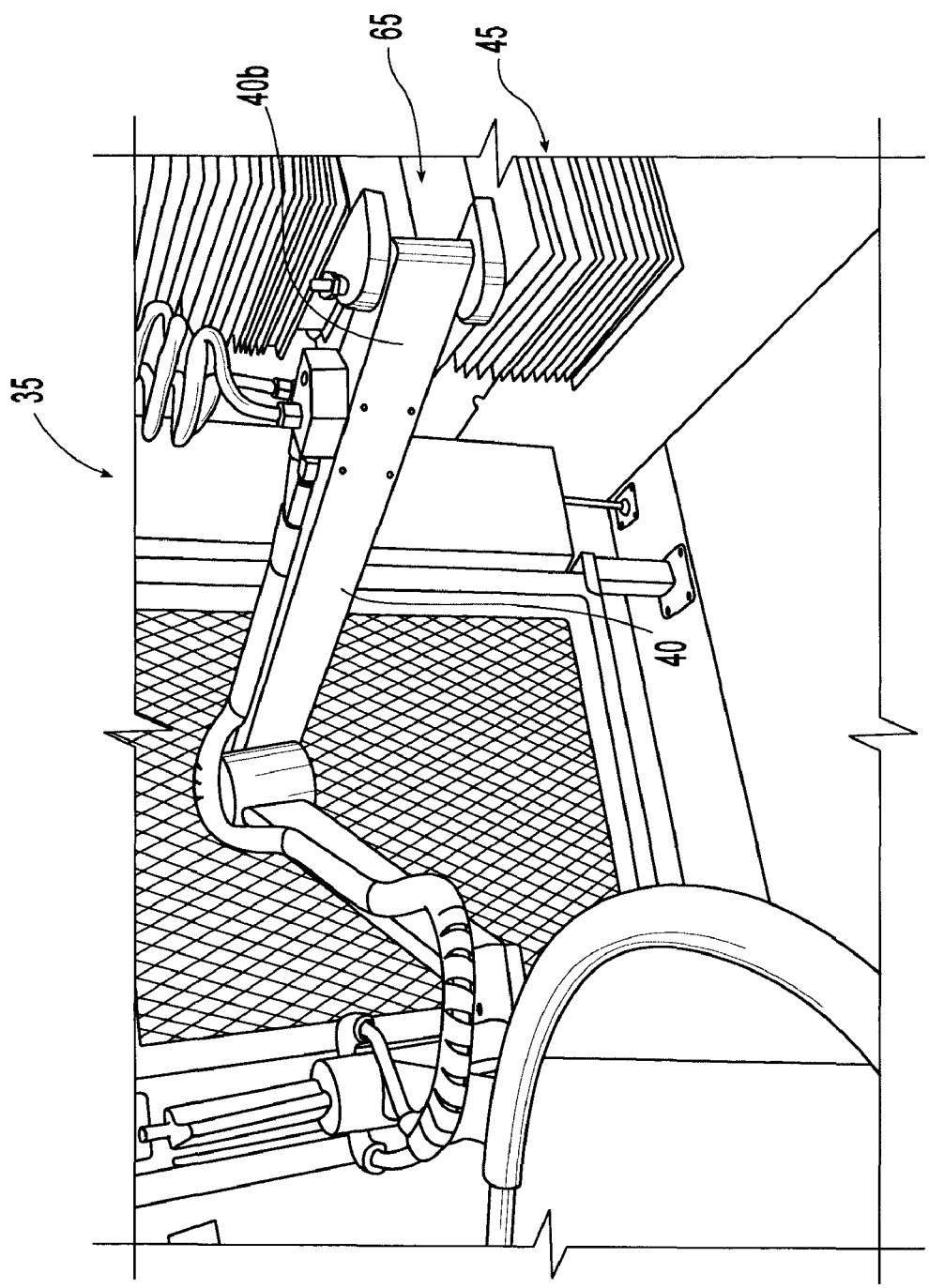
FIG. 3 is a perspective view of one embodiment of an ergonomic tool lifting machine of the present invention.

One embodiment of an ergonomic tool lifting machine 35 of the present invention can be seen in FIG. 3. As shown, the ergonomic tool lifting machine 35 includes an articulating arm 40 coupled at a fixed end 40b to a vertical lift mechanism 45. A tool holder 75 (see FIGS. 5-9) is affixed to the free end 40a of the articulating arm 40 for grasping a milling cutter.

Preferably, the ergonomic tool lifting machine 35 is self-contained, such that it may be set up virtually anywhere. That is, the ergonomic tool lifting machine 35 preferably has its own framework, and need only be secured to a frame of another machine, to a building wall or support post, or any number of other sufficiently sturdy elements.

The articulating arm 40 is shown to be substantially horizontally oriented, although other orientations may also be possible. The articulating arm 40 may have any number of joints or segments, as long as it is able to transport milling cutters between a storage position and the spindle of an associated milling machine(s). An operator is able to easily expand or contract the articulating arm 40 as necessary to install or store milling cutters. Such articulating arms would be well known to one skilled in the art and, therefore, need not be described in further detail herein.

Figure 4A:
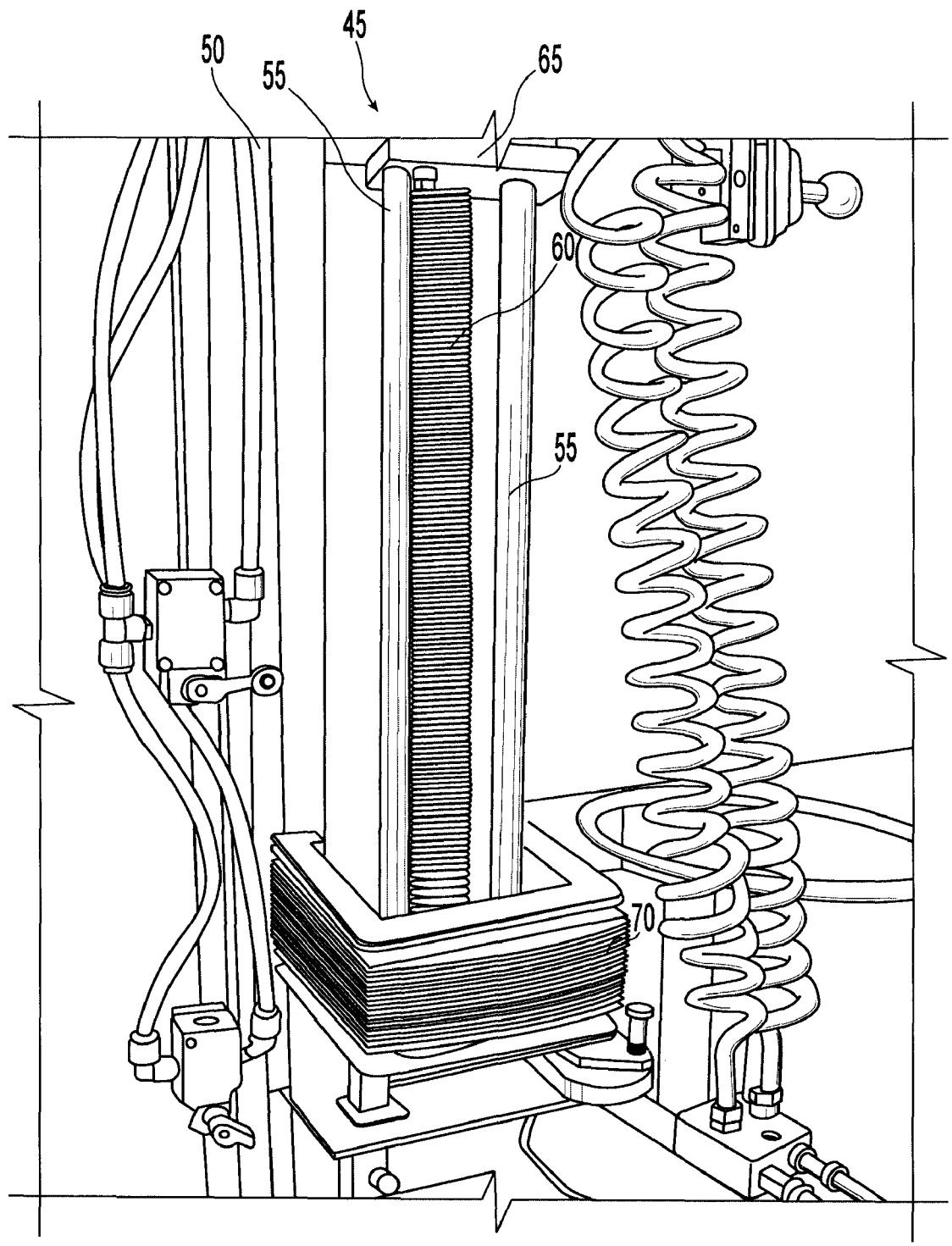
FIGS. 4a and 4b are enlarged views of a vertical lift mechanism portion of the ergonomic tool lifting machine of FIG. 3.
Figure 4B:
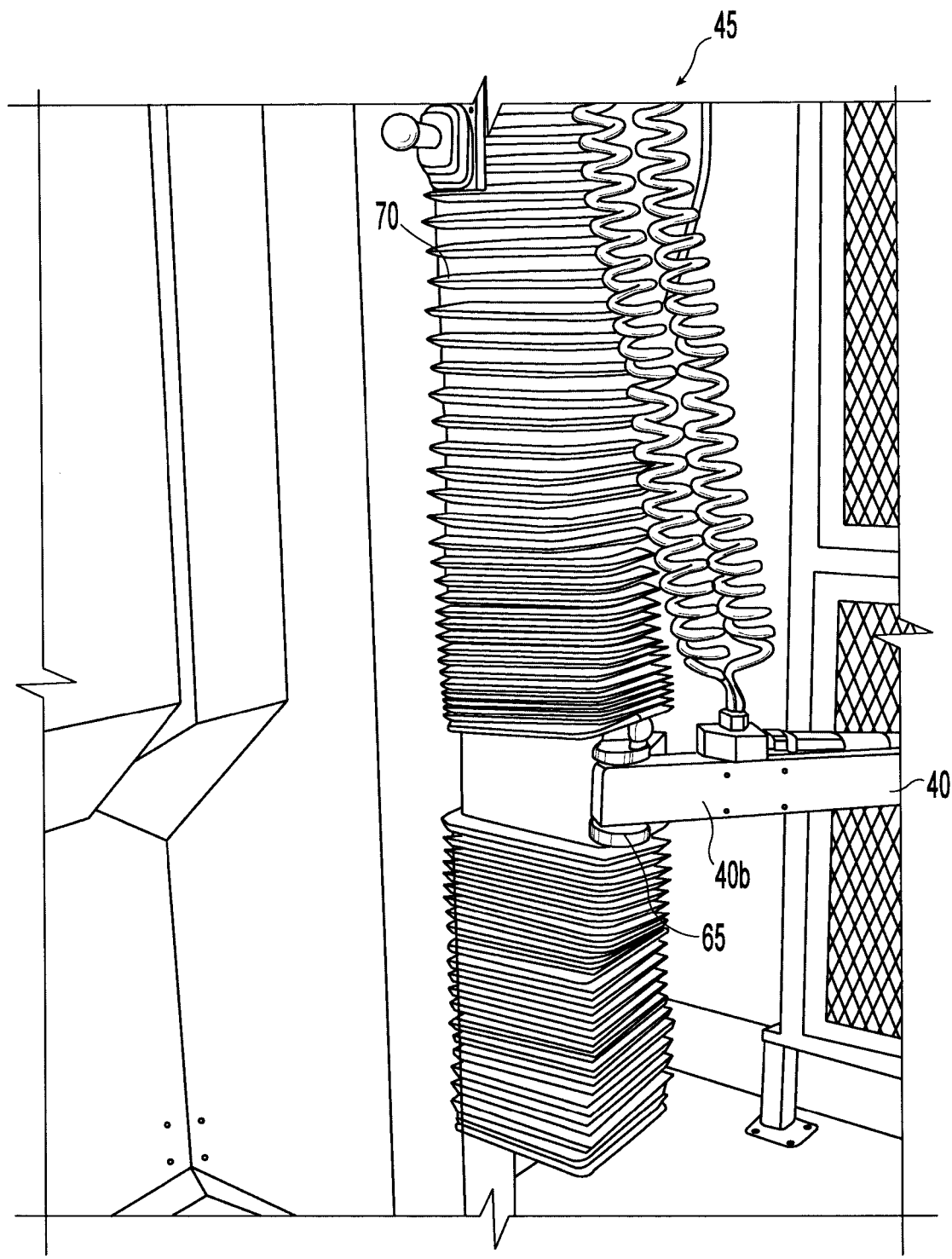
Figure 5:
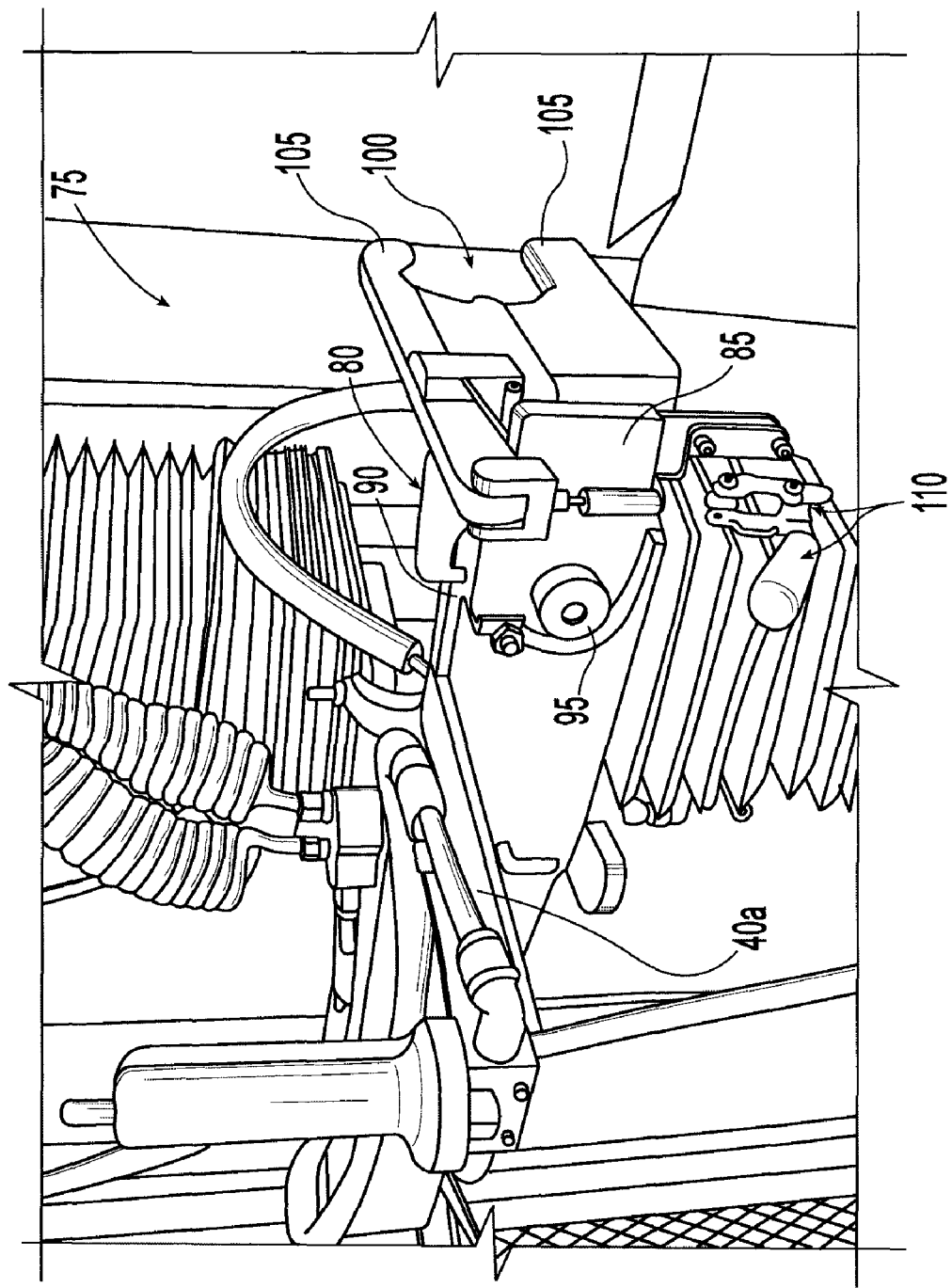
FIG. 5 is an enlarged view of a tool holder portion of the ergonomic tool lifting machine of FIG. 3.

Referring to FIGS. 4a and 4b, it can be readily observed that the fixed end 40b of the articulating arm 40 is coupled to the vertical lift mechanism 45. The vertical lift mechanism generally includes a frame 50, one or more guiding elements, and an associated drive mechanism. An articulating arm connector 65 is also provided for coupling the articulating arm 40 to the vertical lift mechanism 45. Preferably, the articulating arm connector 65 is pivotally coupled to the articulating arm 40 so that the articulating arm is provided with an increased range of motion. In operation, the articulating arm connector 65 travels along the guiding elements while being moved vertically by the drive mechanism.

In the particular embodiment of the present invention shown in FIGS. 4a and 4b, the guiding elements are provided in the form of a pair of linear guide rods 55 that are attached at their lower and upper ends to a corresponding portion of the frame 50. The guide rods 55 pass through receiving apertures in the articulating arm connector 65, such that a smooth and accurate vertical motion is imparted to the articulating arm 40. Preferably, but not necessarily, the guide rods 55 pass through bushings in the articulating arm connector 65.

The drive mechanism of this particular embodiment is comprised of a drive screw 60. The drive screw 60 also passes through the articulating arm connector 65, but is in threaded engagement therewith. Mating threads may be provided directly in the articulating arm connector 65, or a separate element, such as a threaded bushing, may be affixed thereto. In any event, rotation of the drive screw 60 causes a vertical movement of the articulating arm connector 65. As such, vertical movement is likewise imparted to the articulating arm 40.

Although the use of a drive screw-type drive mechanism is preferred due to its inherent accuracy and ability to maintain the position of the articulating arm 40 during a loss of power, it should be realized that other types of drive mechanisms could also be used with the vertical lift mechanism 45. For example, a pneumatic or hydraulic cylinder, or a drive motor and gear rack may also be used. In one embodiment of the present invention, an air motor is used to rotate the drive screw. This may, of course, be replaced with a hydraulic or electric motor.

Accurate positioning of the vertical lift mechanism 45 may be provided in various ways, such as through use of the limit switches shown in FIG. 4a. Other position detection means familiar to one skilled in the art can also be employed, such as, for example, photoswitches or proximity detectors. Such switches/detectors may be activated by a trip dog or other element attached to the articulating arm connector 65 or another portion of the vertical lift mechanism 45.

Preferably, but not essentially, the vertical lift mechanism 45 is enclosed or otherwise guarded to minimize or eliminate pinch points. For example, in the embodiment of FIG. 4b, a collapsible bellows 70 surrounds much of the vertical lift mechanism 45. The bellows 70 serves to limit access to the vertical lift mechanism 45, as well as to keep the guide rods 55 and drive screw 60 clean.

Referring now to FIGS. 5-9, various views of one embodiment of a grasping device in the form of a tool holder 75 can be observed. It should be realized, however, that the specific design of a grasping device of the present invention may depend on the object it will be used to move and, therefore, even another tool holder of the present invention may differ considerably from the tool holder 75 shown and described herein.

Figure 6:
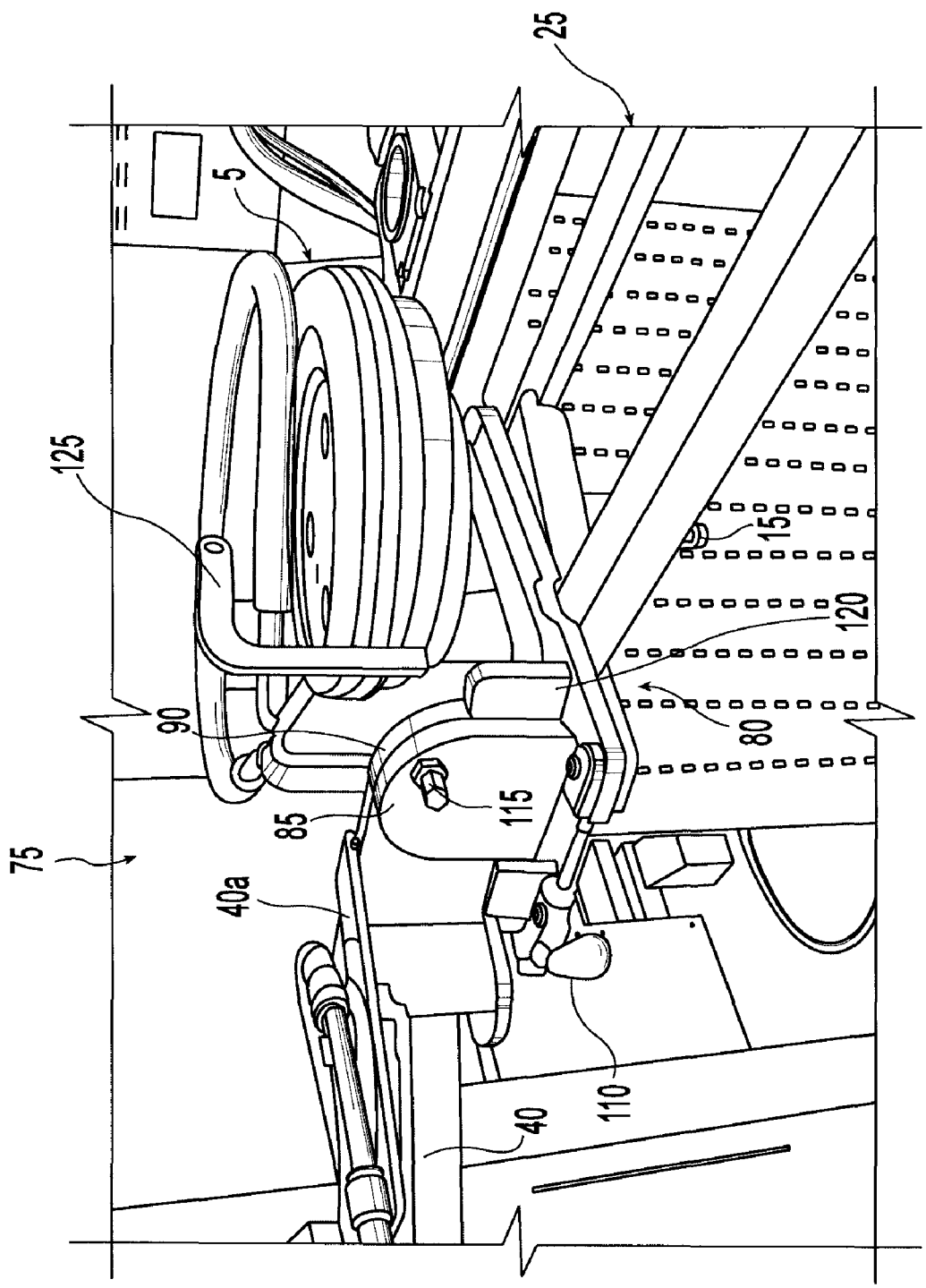
FIG. 6 depicts the tool holder of FIG. 5 engaged with the stored milling cutter of FIG. 2.

As shown, the tool holder 75 is affixed to the free end 40a of the articulating arm 40. This particular embodiment of the tool holder 75 also includes a rotating bracket assembly 80 that connects the tool holder 75 to the free end 40a of the articulating arm 40. The rotating bracket assembly 80 includes a first plate 85 to which is attached a gripper 100, and a second plate 90 that is attached to the free end 40a of the articulating arm 40. The first plate 85 and gripper 100 rotate with respect to the second plate 90 about a connecting pin 95. FIGS. 5 and 7-9 depict the tool holder 75 in an installation/removal position, while FIG. 6 illustrates the tool holder 75 in a pick-up/drop-off position.

As mentioned above, this embodiment of the tool holder 75 includes a gripper 100. The gripper 100 is adapted to engage the milling cutter 5. Preferably, the gripper 100 is designed to engage with a groove normally present on typical large-scale milling cutters.

A clamp 110 is preferably associated with the gripper 100. More specifically, once the gripper 100 has been properly positioned on the milling cutter 5, the clamp 110 is actuated to ensure that the gripper firmly retains the milling cutter. In this particular embodiment, the clamp 110 functions to pivot one of two gripper fingers 105 present on the gripper 100, thereby increasing or decreasing the clamping force exerted by the gripper on the milling cutter 5. Obviously, other clamp designs are also possible.

The tool holder 75 is also preferably provided with a position lock 115, which functions to keep the tool holder in the pick-up/drop-off or installation/removal position, as desired. In this particular embodiment, the position lock 115 is comprised of a spring-loaded pin that interacts with the rotating bracket assembly 80. More specifically, the spring-loaded pin extends through the first plate 85 and enters into a receiving hole (not visible) in the second plate 90 when the tool holder 75 is in either the pick-up/drop-off or installation/removal position—thereby locking the position of the tool holder. When a position change is desired, the operator simply retracts the position lock (pin) 115 and rotates the tool holder 75.

Because of the often significant weight of large milling cutters, it is also preferable that the tool holder 75 be provided with a roll-over interlock 120. In this embodiment of the tool holder 75, the roll-over interlock 120 comprises a hard stop that rotates along with the rotating bracket assembly 80. As can be best understood by reference to FIGS. 6 and 9, the hard stop 120 is attached to a base portion of the gripper 100—although it could also be attached to the first plate 85. The hard stop 120 rides against, or very near, the side of the second plate 90 as the tool holder 75 is rotated. Contact between the hard stop 120 and the second plate 90 can be seen to prevent the tool holder 75 from rotating much past the pick-up/drop-off or installation/removal position.

Obviously other types of hard stops could also be used to accomplish the same result. Similarly, a hard stop(s) may be located at a different position on the tool holder. These variations would be obvious to one skilled in the art, and such variations are considered to be within the scope of the present invention.

As can be best observed in FIG. 6, the ergonomic tool lifting machine 35 may also be fitted with a docking bracket 125 that can be used to secure the position of the articulating arm 40 when the ergonomic tool lifting machine is not in use. In this particular embodiment, the docking bracket 125 extends from the tool holder 75, although it could obviously be located elsewhere. The articulating arm 40 is shown in a docked position in FIG. 5—the docking bracket 125 being temporarily coupled to a portion of the vertical lift mechanism 45.

To better explain the operation of this particular embodiment of an ergonomic tool lifting machine 35 of the present invention, its use in removing a milling cutter 5 from a storage rack 25 and subsequently installing the milling cutter into the horizontally-oriented spindle 130 of a milling machine is described in detail below. This exemplary process description assumes that the tool holder 75 is already in the pick-up/drop-off position. If such is not the case, the operator would simply place the tool holder 75 into this position prior to the first described step of the process.

In order to install a milling cutter 5 to a milling machine having a horizontally-oriented spindle 130, an operator first guides the articulating arm 40 to the storage rack 25 where idle milling cutters are stored. As can be seen in FIG. 6, the milling cutter 5 of interest is stored in a vertical position on the rack 25. In the stored position, a portion of the milling cutter 5 extends upward above the rack 25. The gripper 100 of the tool holder 75 is guided by the operator to this protruding section of the milling cutter 5 and is engaged therewith. Preferably, but not necessarily, the gripper is engaged with a circumferential groove (not visible) present on the cutter 5. Once proper engagement of the gripper 100 with the cutter 5 is achieved, the clamp 110 is actuated to firmly secure the milling cutter 5 to the tool holder 75. This arrangement is illustrated in FIG. 6.

Once the milling cutter 5 is securely clamped in the tool holder 75, the vertical lift mechanism 45 is activated to raise the milling cutter to a position (not shown) sufficiently high above the rack 25 to permit rotation of the tool holder 75 and milling cutter 5. Activation of the vertical lift mechanism 45 may be accomplished by any variety of means, such as by way of a pushbutton(s), lever(s), or some other suitable actuator. Preferably, but not necessarily, activation of the vertical lift mechanism 45 requires an operator to use both hands, thereby minimizing the risk of contact between the operator and moving parts of the ergonomic tool lifting machine 35.

In certain embodiments of the ergonomic tool lifting machine 35, the operator may be responsible for stopping the vertical lift mechanism 45 at the correct height to allow for proper and subsequent installation of the milling cutter 5 into the milling machine spindle 130. Preferably, however, the vertical lift mechanism 45 automatically stops at the correct position, such as through use of the limit switches and/or other position detecting devices discussed above. Preferably, this is also the case whether the vertical lift mechanism 45 is operating to raise or lower the articulating arm 40.

With the milling cutter 5 residing at the proper height, the operator releases the position lock 115 (in this particular case, the spring-loaded pin) and rotates the tool holder 75 and milling cutter into the installation/removal position. The operator then re-engages the position lock 115 to ensure that the tool holder 75 remains in this position (see FIG. 7). The milling cutter 5 is now properly oriented for installation to the milling machine spindle 130.

Figure 8:
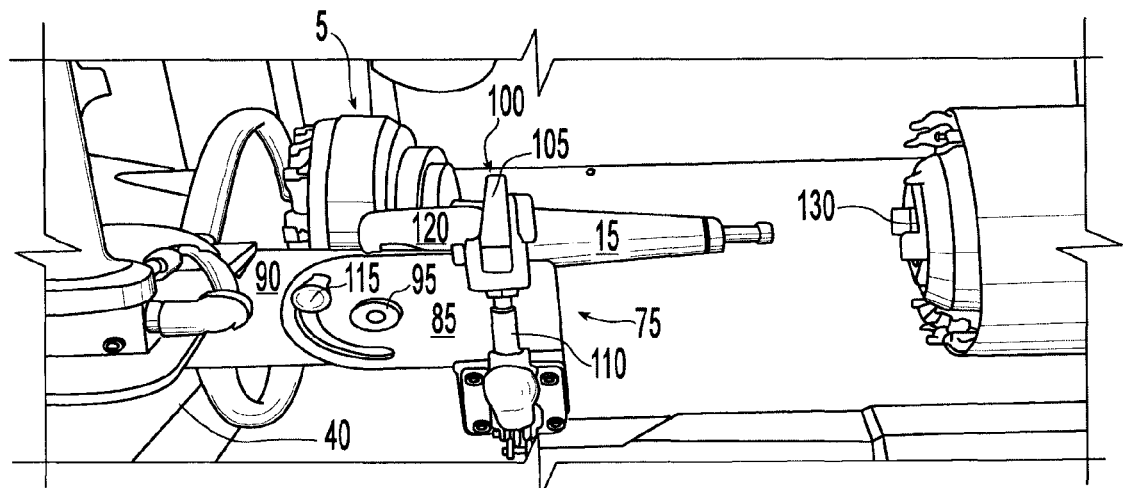
FIG. 8 shows the tool holder and milling cutter just prior to its installation to the spindle of a horizontal milling machine.
Figure 9:
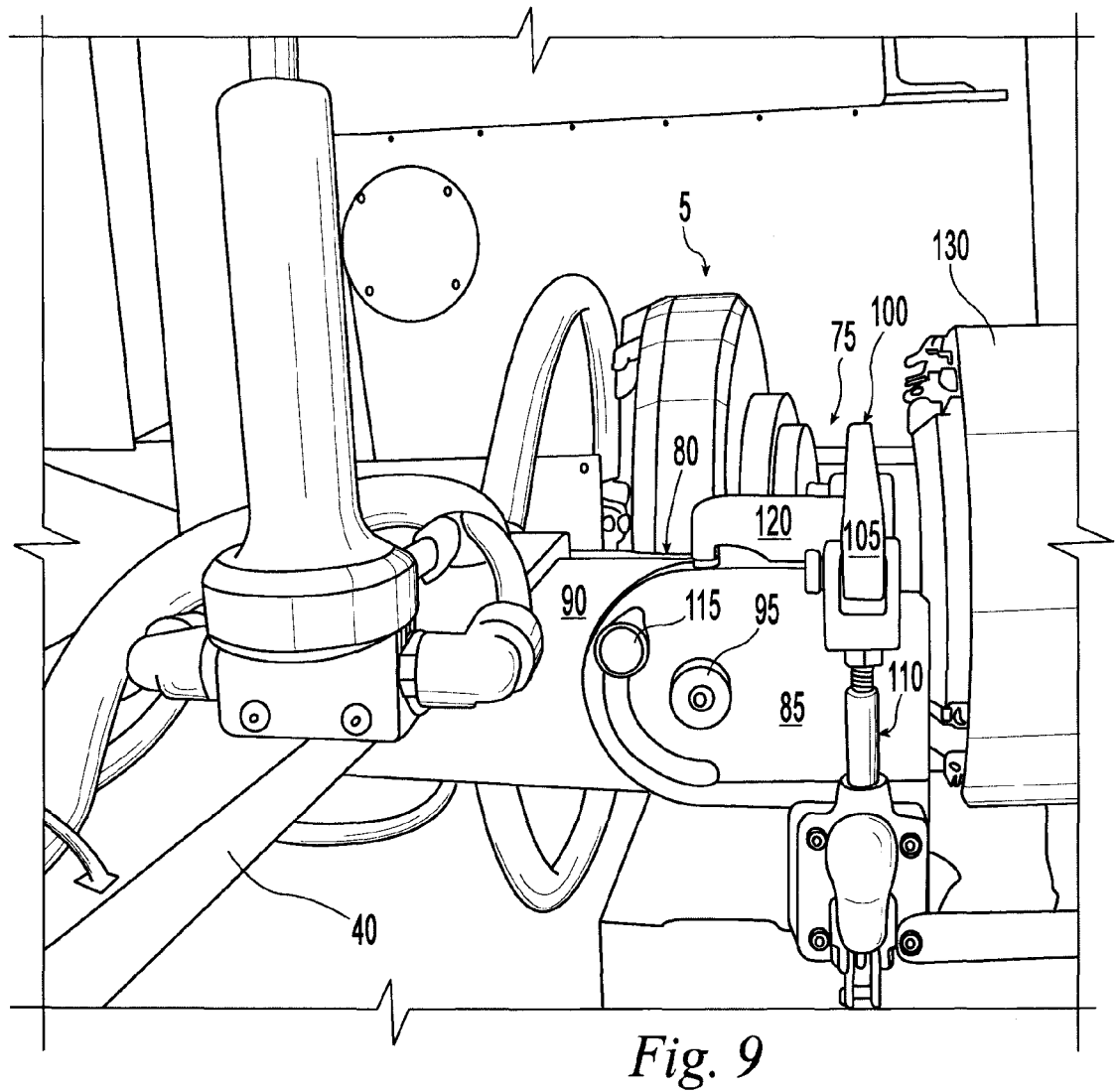
FIG. 9 illustrates the milling cutter installed to the spindle of the milling machine.

As shown in FIG. 8, the operator next guides the articulating arm 40 toward the milling machine, while simultaneously aligning the machine taper 15 with the milling machine spindle 130. When proper alignment is achieved, the machine taper 15 is inserted into the milling machine spindle 130, as illustrated in FIG. 9. The operator subsequently unclamps the gripper 100 and withdraws the tool holder 75 from the milling cutter 5. The articulating arm 40 may then be moved to a safe position and the milling cutter 5 may be clamped in the spindle 130 as normal.

As would be clearly understood by one skilled in the art, this process could be reversed to remove a milling cutter 5 from the milling machine and deposit it to the storage rack 25. Regardless of the specific process, however, the ergonomic tool lifting machine 35 of the present invention greatly reduces the effort required of an operator while transporting, transferring, or otherwise manipulating heavy objects.

Having described above one exemplary embodiment of an ergonomic tool lifting machine 35, it would be understood by one skilled in the art that certain aspects of the machine may be accomplished in other ways without departing from the scope of the present invention. Similarly, it should be understood that an ergonomic tool lifting machine of the present invention may be used to transport, transfer, or otherwise manipulate loads other than milling cutters. Such loads may include other types of tools or objects wholly unrelated to tools. In the latter case, the present invention may be described more broadly as simply an ergonomic load lifting machine. Consequently, while certain embodiments of the present invention are described in detail above, the scope of the invention is not to be considered limited by such disclosure, and modifications are possible without departing from the spirit of the invention as evidenced by the following claims:

What is claimed is:

1. An ergonomic lift assist machine for manipulating a milling cutter, comprising:
    a manually displaceable articulating arm having a fixed end and a free end;
    a powered vertical lift mechanism coupled to said fixed end of said articulating arm, said vertical lift mechanism for raising and lowering said articulating arm; and
    a tool holder attached to said free end of said articulating arm, said tool holder having a gripper for grasping and retaining a milling cutter, said tool holder being manually rotatable by an operator of said machine between a pick-up and drop-off position wherein a longitudinal axis of said milling cutter is substantially perpendicular to the ground and an installation and removal position wherein said longitudinal axis of said milling cutter is substantially parallel to the ground; and
    a position lock associated with said tool holder, said position lock including a retractable spring-loaded pin that extends through a plate attached to the tool holder and enters into a receiving hole in a plate attached to said free end of said articulating arm when said tool holder is in either said pick-up and drop-off position or said installation and removal position, said position lock operable to secure said tool holder in said pick-up and drop-off position or said installation and removal position;
    wherein said ergonomic lift assist machine allows an operator to manually transfer a milling cutter between said pick-up and drop-off position and said installation and removal position while the weight of said machine tool is supported by said articulating arm.

2. The ergonomic lift assist machine of claim 1, wherein said fixed end of said articulating arm is pivotally coupled to said vertical lift mechanism.

3. The ergonomic lift assist machine of claim 1, further comprising a screw drive associated with said vertical lift mechanism and operable to raise and lower said articulating arm.

4. The ergonomic lift assist machine of claim 1, further comprising one or more guide elements associated with said vertical lift mechanism and operable to direct vertical movement of said articulating arm.

5. The ergonomic lift assist machine of claim 1, wherein said tool holder is rotatable through an angle of at least 90 degrees.

6. The ergonomic lift assist machine of claim 1, further comprising a roll-over interlock operable to prevent said tool holder from rotating substantially beyond either of said pick-up and drop-off position or said installation and removal position.

7. The ergonomic lift assist machine of claim 1, wherein said gripper is designed to grasp an exterior portion of said milling cutter.

8. The ergonomic lift assist machine of claim 1, wherein said gripper is adapted to engage a slot located on said milling cutter.

9. The ergonomic lift assist machine of claim 1, further comprising a clamp for securing said tool holder to said milling cutter.

10. An ergonomic lift assist machine for transferring a milling cutter between a storage position wherein a longitudinal axis of said milling cutter is substantially perpendicular to the ground and an installation position in a milling machine spindle wherein a longitudinal axis of said milling cutter is substantially parallel to the ground, comprising:
    a manually displaceable articulating arm having a fixed end and a free end, a longitudinal axis of said articulating arm being substantially horizontally oriented with respect to the ground;
    a powered vertical lift mechanism coupled to said fixed end of said articulating arm, said vertical lift mechanism for raising and lowering said articulating arm;
    a tool holder attached to said free end of said articulating arm, said tool holder having a gripper for grasping and retaining a milling cutter, said tool holder being manually rotatable by an operator of said machine so as to rotate said milling cutter between said storage position and said installation position associated with said milling cutter; and
    a position lock associated with said tool holder, said position lock including a retractable spring-loaded pin that extends through a plate attached to the tool holder and enters into a receiving hole in a plate attached to said free end of said articulating arm when said tool holder is in either said pick-up and drop-off position or said installation and removal position, said position lock operable to secure said tool holder in said storage position or said installation position;
    wherein said articulating arm supports the weight of said milling cutter during a manual transfer between the respective storage and installation positions by an operator.

11. The ergonomic lift assist machine of claim 10, wherein said fixed end of said articulating arm is pivotally coupled to said vertical lift mechanism.

12. The ergonomic lift assist machine of claim 10, further comprising a screw drive associated with said vertical lift mechanism and operable to raise and lower said articulating arm.

13. The ergonomic lift assist machine of claim 10, further comprising one or more guide elements associated with said vertical lift mechanism and operable to direct vertical movement of said articulating arm.

14. The ergonomic lift assist machine of claim 10, wherein said tool holder is rotatable through an angle of at least 90 degrees.

15. The ergonomic lift assist machine of claim 10, further comprising a roll-over interlock operable to prevent said tool holder from rotating substantially beyond either of said storage position or said installation position.

16. The ergonomic lift assist machine of claim 10, wherein said gripper is designed to grasp an exterior portion of said milling cutter.

17. The ergonomic lift assist machine of claim 10, wherein said gripper is adapted to engage a slot located on a machine taper portion of said milling cutter.

18. The ergonomic lift assist machine of claim 10, further comprising a clamp for securing said tool holder to said milling cutter.

19. An ergonomic lift assist machine for changing a machine tool, comprising:
   a manually displaceable articulating arm having a fixed end and a free end;
   a powered vertical lift mechanism coupled to said fixed end of said articulating arm, said vertical lift mechanism for raising and lowering said articulating arm;
   a tool holder attached to said free end of said articulating arm, said tool holder designed to grasp and retain a machine tool and adapted for manual rotation about a substantially horizontal axis by an operator of said machine between a pick-up and drop-off position and an installation and removal position associated with said machine tool; and
   a position lock associated with said tool holder, said position lock including a retractable spring-loaded pin that extends through a plate attached to the tool holder and enters into a receiving hole in a plate attached to said free end of said articulating arm when said tool holder is in either said pick-up and drop-off position or said installation and removal position, said position lock operable to secure said tool holder in said pick-up and drop-off position or said installation and removal position;
   wherein said ergonomic lift assist machine allows an operator to manually transfer a machine tool between said pick-up and drop-off position and said installation and removal position without the need for any lifting of said tool by the operator.

20. The ergonomic lift assist machine of claim 19, wherein said fixed end of said articulating arm is pivotally coupled to said vertical lift mechanism.

21. The ergonomic lift assist machine of claim 19, further comprising a screw drive associated with said vertical lift mechanism and operable to raise and lower said articulating arm.

22. The ergonomic lift assist machine of claim 19, further comprising one or more guide elements associated with said vertical lift mechanism and operable to direct vertical movement of said articulating arm.

23. The ergonomic lift assist machine of claim 19, wherein said tool holder is rotatable through an angle of at least 90 degrees.

24. The ergonomic lift assist machine of claim 19, further comprising a roll-over interlock operable to prevent said tool holder from rotating substantially beyond either of said pick-up and drop-off position or said installation and removal position.

25. The ergonomic lift assist machine of claim 19, wherein said tool holder includes a gripper designed to grasp an exterior portion of said machine tool.

26. The ergonomic lift assist machine of claim 25, wherein said gripper is adapted to engage a slot located on said machine tool.

27. The ergonomic lift assist machine of claim 19, further comprising a clamp for securing said tool holder to said machine tool.

28. The ergonomic lift assist machine of claim 19, wherein said machine tool is a milling cutter.

\* \* \* \* \*

UNITED STATES PATENT AND TRADEMARK OFFICE
CERTIFICATE OF CORRECTION

| | | |
|---|---|---|
| PATENT NO. | : 7,972,252 B1 | Page 1 of 1 |
| APPLICATION NO. | : 11/277634 | |
| DATED | : July 5, 2011 | |
| INVENTOR(S) | : McDermitt, Jr. | |

It is certified that error appears in the above-identified patent and that said Letters Patent is hereby corrected as shown below:

In column 7, line 46, please delete "arm; and" and insert -- arm; --

Signed and Sealed this
Thirtieth Day of August, 2011

David J. Kappos
*Director of the United States Patent and Trademark Office*